United States Patent [19]

Shimuzu

[11] Patent Number: 5,317,748
[45] Date of Patent: May 31, 1994

[54] INFORMATION PROCESSING APPARATUS FOR PERFORMING TWO-WAY INTERRUPTION PROCESSING

[75] Inventor: Noriaki Shimuzu, Kawasaki, Japan

[73] Assignee: Kabushiki Kaisha Toshiba, Kawasaki, Japan

[21] Appl. No.: 913,714

[22] Filed: Jul. 16, 1992

[30] Foreign Application Priority Data

Jul. 17, 1991 [JP] Japan ............................ 3-176831

[51] Int. Cl.⁵ ........................ G06F 9/46; G06F 13/14
[52] U.S. Cl. .................................. 395/725; 364/228.5; 364/241.9; 364/241.2; 364/240; 364/240.2; 364/DIG. 1
[58] Field of Search ............... 395/325, 800, 200, 275, 395/725; 370/85.1, 61; 340/825.03; 361/395

[56] References Cited

U.S. PATENT DOCUMENTS

| | | | |
|---|---|---|---|
| 4,418,382 | 11/1983 | Larson et al. | 364/200 |
| 4,494,194 | 1/1985 | Harris et al. | 364/200 |
| 4,779,190 | 10/1988 | O'Dell et al. | 364/200 |
| 4,799,144 | 1/1989 | Parruck et al. | 364/200 |
| 4,982,325 | 1/1991 | Tignor et al. | 364/200 |
| 5,023,823 | 6/1991 | Cargin, Jr. et al. | 361/683 |
| 5,063,494 | 11/1991 | Davidowski et al. | 395/800 |
| 5,077,683 | 12/1991 | Aydin | 361/686 |
| 5,109,517 | 4/1992 | Honda et al. | 395/800 |
| 5,131,092 | 7/1992 | Sackmann et al. | 395/800 |
| 5,134,706 | 7/1992 | Cushing et al. | 395/725 |
| 5,265,255 | 11/1993 | Bonevento et al. | 395/725 |

*Primary Examiner*—Gopal C. Ray
*Attorney, Agent, or Firm*—Cushman, Darby & Cushman

[57] ABSTRACT

An information processing apparatus is of such a type that, between a system including a main board and a corresponding expansion board mounted in a corresponding expansion slot, the apparatus makes a given interruption to the expansion board, via a system bus, for each slot. The main board comprises a main CPU for gaining access to an interruption input/output port corresponding to one associated expansion board and a system bus interface for selecting one expansion board to which an interruption is to be made. The expansion board comprises a system bus interface for receiving an expansion slot select signal from the system bus interface and generating a control signal, an interruption input/output address decoder for decoding an input-/output address entered via the system bus and for generating an interruption signal, and a sub CPU for receiving the interruption signal and for performing interruption processing.

5 Claims, 2 Drawing Sheets

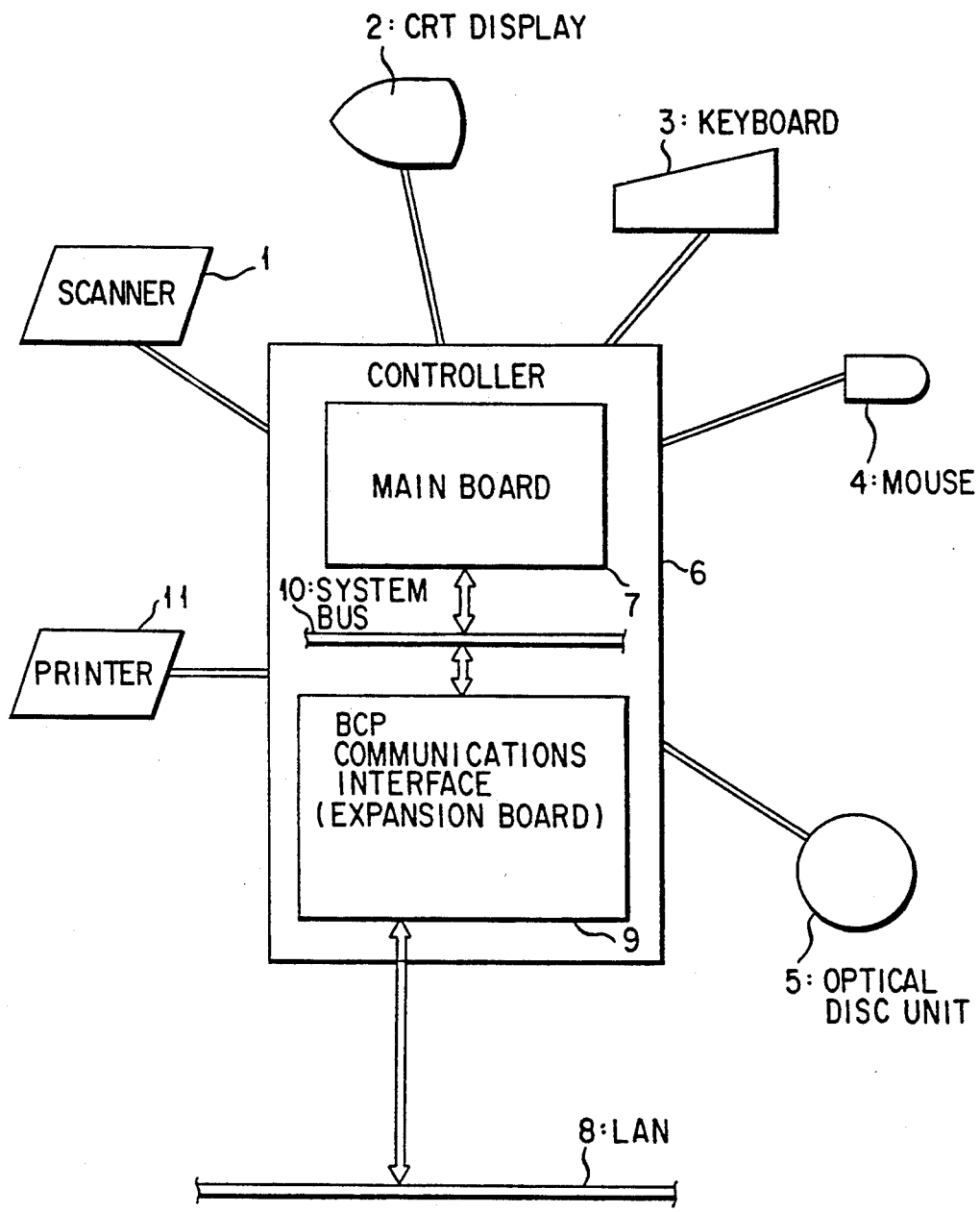
F I G. 1

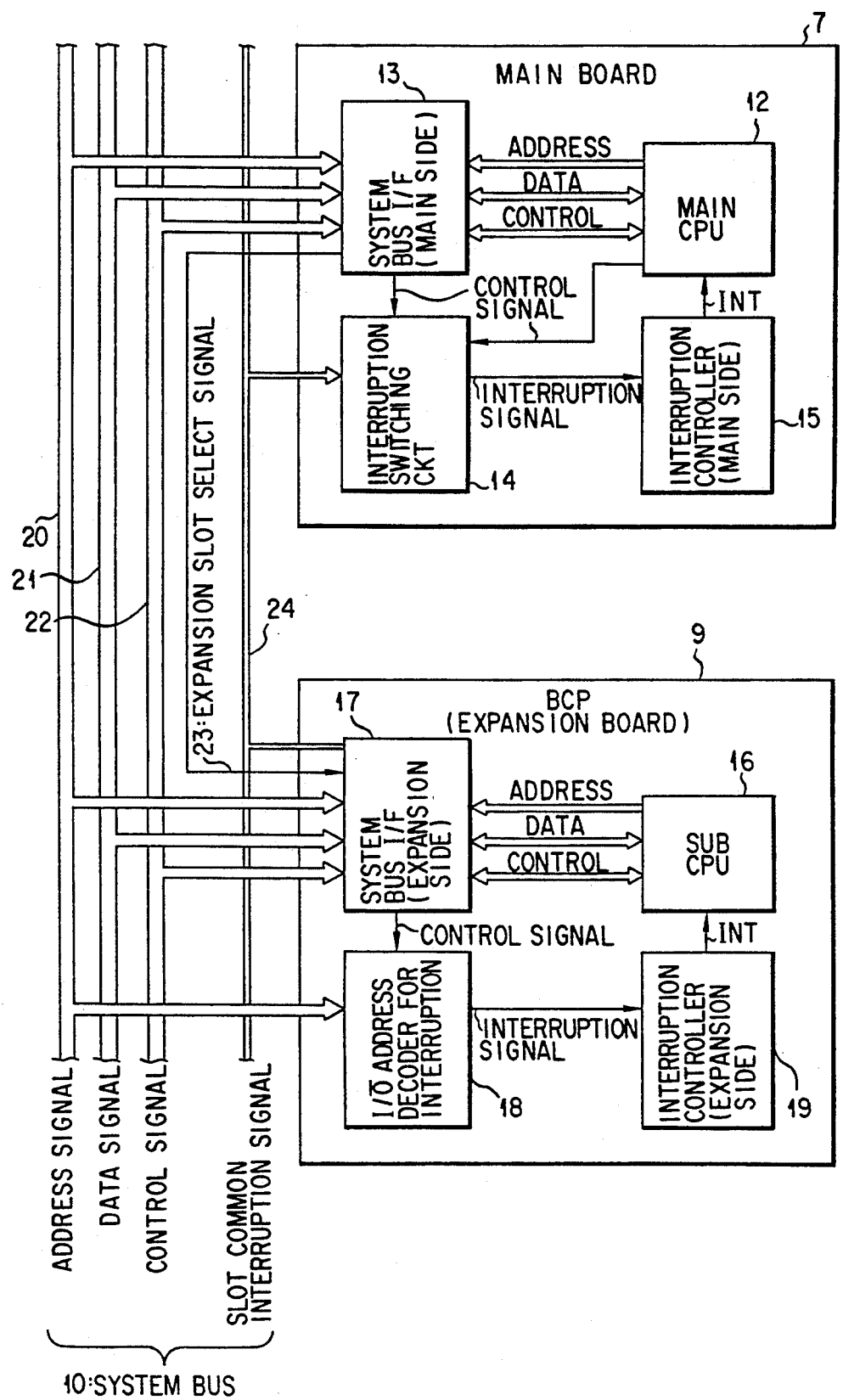
F I G. 2

INFORMATION PROCESSING APPARATUS FOR PERFORMING TWO-WAY INTERRUPTION PROCESSING

BACKGROUND OF THE INVENTION

1. Field of the Invention

The present invention relates to an information processing apparatus for an electronic filing apparatus for, for example, recording image information and retrieving it and, in particular, to an information processing apparatus of such a type that, between a system including a main board and a corresponding expansion board mounted in a corresponding expansion slot, the apparatus makes a given interruption to the expansion board, via a system bus, on each slot basis.

2. Description of the Related Art

In a conventional electronic filing apparatus for recording image information and retrieving it, a plurality of expansion slots equipped with a corresponding expansion board are connected, via a system bus, to a main board of a function expansion system.

If in this case, a common interruption line is connected to the expansion slots and, with the upper bits of an I/O address varied from slot to slot, a corresponding expansion is selected with a corresponding decoder signal, then an interruption can be implemented, eve if the individual expansion board is provided in the corresponding expansion slot, so that a function expansion can be achieved.

Since, however, the number of a common interruption signal lines in the system bus which are provided common to the respective expansion slots is initially given, the number of the expansion slots is increased and, if an interruption is to be independently made to a corresponding expansion slot, then a shortage in the number of interruption signal lines is encountered in a design layout.

SUMMARY OF THE INVENTION

It is accordingly the object of the present invention to provide an information processing apparatus which can achieve an independent interruption from a system-side main board to a corresponding one of a plurality of expansion slots, including the same type of expansion board, with the number of interruption signal lines given.

In order to achieve the aforementioned object of the present invention, there is provided an information processing apparatus comprising:

a unit for storing information and for reproducing the stored information;

an input/output unit provided relative to the storing-/reproducing unit; and a control unit, provided between the storing/reproducing unit and the input/output unit, for performing information processing control, wherein the control unit comprises a system-side main board and a plurality of expansion boards each provided in an expansion slot and connected via a system bus to the main board;

the system-side main board comprises a main CPU (central processing unit) for controlling the information, managing the presence or absence of the expansion board and gaining access to an input/output port, by an interruption, corresponding to that associated expansion board and an expansion board select unit, connected to the main CPU, for selecting, when an interruption is made to the expansion board, one corresponding expansion board to be interrupted; and the expansion board comprises a system bus interface unit for receiving an expansion slot select signal from the expansion board select unit and for generating a control signal, an interruption detection unit for decoding an input/output address entered via the system bus and for receiving the control signal and for generating an interruption signal, an interruption control unit, connected to the interruption detection unit, for receiving the interruption signal and for generating an interruption request signal, and a sub CPU (central processing unit), connected to the interruption control unit and system bus interface unit, for receiving the interruption request signal and for performing interruption processing.

By so doing, the information processing apparatus of the present invention can make an independent interruption from the system-side main board to the expansion board, including the same type of expansion board, and can do so without encountering a shortage in the number of interruption signal lines upon a design layout.

An interruption from the main board to the expansion board is made by gaining access to the I/O port by the system side. Upon making an interruption from the expansion board to the main board, determination is made as to whether there is a common interruption request from the expansion board or an independent interruption request from the individual expansion board. If there is such an independent interruption request from the individual expansion board, then a corresponding interruption signal is generated and, through the interruption processing of the main CPU, an independent interruption can be done from the system to the corresponding expansion board on each expansion board basis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an electronic filing apparatus illustrating an information processing apparatus according to one embodiment of the present invention; and FIG. 2 is a block diagram showing one form of a control/section in the apparatus shown in FIG. 1.

DETAILED DESCRIPTION OF THE PREFERRED EMBODIMENTS

An embodiment of the present invention will be explained below with reference to the accompanying drawings.

FIG. 1 shows an electronic filing apparatus according to the embodiment of the present invention.

That is, the electronic filing apparatus comprises a controller 6 for controlling a whole operation and a data stream, as well as a scanner 1, an optical disc unit 5, a key board 3, a CRT display 2, a printer 11 and mouse 4 all connected to the controller 6.

The scanner 1 is comprised of a two-dimensional scanning apparatus having a readout section which is constituted by, for example, a CCD image sensor. The scanner scans a document with a laser beam in a two-dimensional way to obtain an electrical signal corresponding to image data on a document.

The CRT display 2 is comprised of, for example, a cathode ray tube display unit adapted to display image data read out by the scanner 1 or code data, image data, etc., read out through the optical disc unit 5, and an operation menu and so on. The CRT display 2 is of a multi-window type to enable four image data to be displayed at a time on image data display areas with four windows at max. The image data displayed on the respective window can be subjected to editing, such as scaling, rotation and scrolling, independently.

The keyboard 3 serves as a data input device (man-/machine interface device) for entering inherent retrieval information (title information) corresponding to image data and code data stored in an optical disc as well as various kinds of operation instructions such as a storage, retrieval and editing processing.

The mouse 4 constitutes an input device adapted to freely move a cursor, not shown, in those up/down and right/left directions across a display window, for example, on a CRT screen so that display contents, such as various modes, area designation for image editing, or icons, may be selected or designated at an area relative to which the cursor is set.

The optical disc unit 5 allows image data scanned by the scanner 1, as well as title information, etc., corresponding to individual image data, to be stored in a sequential fashion. The optical disc unit 5 retrieves, out of the optical disc, the title information corresponding to the individual image data designated by, for example, the keyboard 3, as well as image data corresponding to display attribute information such as image size, image direction and number of pages.

The printer 11 prints image data read by the scanner 1, or image data and code data read out of the optical disc or image data displayed on the CRT display 2, as visible information on a recording medium, such as a recording sheet, that is, the printer 11 prints out these image data items as a hard copy.

The controller 6 consists principally of a main board 7 constituting a central control unit for the associated parts or components and a communications interface 9 such as a bus communications processor as an expansion board.

The main board 7 includes a main CPU (as will be set out below) for performing various kinds of control, such as the storage, retrieval, editing processings of image data, as well as an image memory, a display interface, an image processing unit, etc., which are not disclosed in the drawings.

The communications interface 9 controls the transmission and reception of the image data, etc., of the electronic filing apparatus, computer system, etc., which are done via, for example, a local area network (LAN). The communications interface 9 is mounted into an expansion slot, not shown.

A system bus 10 connects the main board 7 to the communications interface 9.

As the communications interface, use may be made of the one which has a universal communications processor (UCP) connected via an interface (RS-232C, GPIB, SCSI) to a external device for a facsimile connection processor (FCP), a personal computer, etc.

FIG. 2 shows a practical arrangement for performing the interruption control of the controller 6 set out above.

The system bus 10 comprises an address signal line 20, a data signal line 21, a control signal line 22, an expansion slot select line 23 and a slot common interruption signal line 24.

A signal alone passing through the expansion signal line 23 of the aforementioned signal lines serves as a different signal per expansion slot which is prepared by decoding the upper bits of an I/O address through a system bus I/F in a main board 7 as will be set out below. A signal on each of the other signal lines is the one common to all those expansion slots.

Over the main board 7 are provided the main CPU 12 as set out above, the system bus I/F 13, an interrupt switching circuit 14, an interrupt controller 15, and so on.

Over the communications interface 9 are provided a sub-CPU 16, a system bus I/F 17, an I/O address decoder 18 for interruption, an interrupt controller 19, and so on.

The operation of the information processing apparatus thus arranged will be explained below.

Interrupting the communications interface 9 from the main board 7 side will be explained below.

At the start of the system, for example, the main CPU 12 reads board ID data (not shown) out of an expansion board and, by so doing, manages which expansion board should be mounted in any particular slot. When, therefore, the main CPU 12 tries to interrupt BCP, then access is gained to the communications interface 9 of interest, that is, to the interruption I/O board corresponding to the expansion slot where BCP is mounted.

At this time, the upper bits of the I/O address are decoded by the main-side system bus I/F 13, thus enabling a selected expansion slot select signal alone which is supplied to the expansion slot via the expansion slot select signal line 23. At this time, those expansion slot select signals are disabled which correspond to the other expansion slot select signal lines, not shown, connected to their associated expansion slots.

On the other hand, the expansion-side system bus I/F 17 in the communication interface 9 which has received an enabled, expansion slot select signal delivers a control signal to the I/O address decoder 18 for interruption. An I/O address which is supplied via the address signal line 20 in the system bus has its lower bits decoded by the I/O address decoder 18 to deliver an interruption signal, as an output, to the interruption controller 19. The interruption controller 19 is responsive to the interruption signal to supply an interruption request signal (INT) to the sub-CPU 16. As a result, the sub-CPU 16 performs interruption processing.

Interrupting the main-board 7 by the communications interface 9 side is achieved as will be set out below.

When the sub-CPU 16 tries to make an interruption to the main board 7, a slot common interruption signal is fed from the expansion-side system bus I/F 17 onto the slot common interruption signal line 24 in the system bus 10 through I/O access by the sub-CPU 16.

The interruption switching circuit 14 on the main board 7 is controlled by a method disclosed in the specification of U.S. patent application Ser. No. 794,255 for instance. That is, the interruption switching circuit 14 is controlled by a control signal coming from the main CPU 12 and determines whether an interruption signal on the slot common interruption signal line 24 corresponds to a common interruption request coming from a plurality of expansion slots on the communications interface side or to an independent interruption request. The interruption switching circuit 14 supplies an interruption signal to the main-side interruption controller 15 when the independent interruption request is involved.

The main-side interruption controller 15 is responsive to the interruption signal to deliver an interruption request signal (INT) to the main CPU 12 where interruption proceeding is carried out.

As set out above, the system-expansion board interruption can be achieved for each expansion slot.

That is, interruption is made from the main board side to the communications interface side via system-side I/O access. On the other hand, interruption is made from the communications interface side to the main board side by determining whether it is a common interruption coming from every expansion slot or an independent interruption coming from each expansion slot and then generating an interruption signal when the independent interruption request is involved. The interruption from the main board side to the communications interface side and that from the communications interface side to the main board side are both made for each expansion slot, allowing the use of a plurality of expansion boards. In this connection it is to be noted that the plurality of expansion boards may be of the same type. Further, the detection of interruption on the communications interface side is achieved by decoding the I/O address by means of the decoder 18, thus enabling the information processing apparatus to be fabricated with less hardware. Even if use is made of the plurality of expansion slots each including the same type of expansion boards, a shortage in some interruption signal lines can be avoided in a design layout.

Although, in the aforementioned embodiment, BCP has been explained as being used as the communications interface, the present invention is not restricted to the aforementioned embodiment. The present invention can be equally applied to other expansion boards.

Further, not only an interference can be achieved between the main board and the expansion board in the electronic filing apparatus but also this can be done between associated units in various kinds of information processing apparatuses having the same function as set out above.

Various changes or modifications of the present invention can be made without departing from the spirit and scope of the present invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing apparatus comprising:
means for storing information;
input/output means for inputting the information to the storing means and for outputting the information from the storing means; and
control means, disposed between the storing means and the input/output means, for performing information processing control, wherein the control means comprises:
a main board,
at least one expansion slot,
an expansion board disposed in the at least one expansion slot, and
a system bus connecting the main board to the expansion board;
wherein the main board comprises:
an input/output port,
a main central processing unit for controlling the information, managing the presence and absence of the expansion board and accessing the input/output port by an interruption that corresponds to the expansion board, and
an expansion board select means, connected to the main central processing unit, for selecting the expansion board by producing an expansion slot select signal and thereby causing the expansion board to be interrupted; and
wherein the expansion board comprises:
a system bus interface means for receiving the expansion slot select signal and for generating a control signal,
an interruption detection means for decoding an input/output address entered from the system bus, for receiving the control signal and for generating an interruption signal,
an interruption control means, connected to the interruption detection means, for receiving the interruption signal and for generating an interruption request signal, and
a sub central processing unit, connected to the interruption control means and the system bus interface means, for receiving the interruption request signal and for performing interruption processing.

2. The information processing apparatus according to claim 1, wherein the interruption detection means comprises an input/output address decoder means for decoding the input/output address.

3. An information processing apparatus comprising:
means for storing information;
input/output means for inputting the information to the storing means and for outputting the information from the storing means; and
control means, disposed between the storing means and the input/output means, for performing information processing control, wherein the control means comprises:
a main board,
at least one expansion slot,
an expansion board disposed in the at least one expansion slot, and
a system bus connecting the main board to the expansion board, the system bus comprises:
a plurality of buses for transferring an address signal, a data signal, a control signal and a slot common interruption signal between the main board and the expansion board;
wherein the main board comprises:
an input/output port, a main processing unit for controlling information, managing the presence and absence of the expansion board and accessing the input/output port by an interruption that corresponds to the expansion board, expansion board select means, connected to the main central processing unit, for selecting the expansion board by producing an expansion slot select signal and thereby causing the expansion board to be interrupted, interruption request determination means, connected to the main central processing unit, the expansion board select means and the system bus, for determining whether a common interruption request is present, for determining if an individual interruption request is present, and for generating an interruption signal when the interruption request determination means determines that the individual interruption request is present, and interruption control means, connected to the interruption request determination means and the main central processing unit, for receiving the interruption signal and for delivering an interruption request signal to the main central processing unit; and wherein the expansion board comprises:

a system bus interface means for receiving the expansion slot select signal and for generating the control signal, interruption input/output address decoder means for decoding an input/output address entered from the system bus, for receiving the control signal and for generating an expansion board interruption signal, expansion board interruption control means, connected to the interruption input/output address decoder means, for receiving the expansion board interruption signal and for generating an expansion board interruption request signal, and a sub central processing unit, connected to the expansion board interruption control means and the system bus interface means, for receiving the expansion board interruption request signal and for performing interruption processing.

4. An information processing apparatus for performing two-way interruption processing between a main board and a plurality of expansion slot, comprising:

storing means for storing information;

input/output means for inputting the information to the storing means and for outputting the information from the storing means; and control means, disposed between the storing means and the input/output means, comprising:

a system side having the main board, a communications interface side having:

the plurality of expansion slots, a plurality of expansion boards, wherein each expansion board is disposed in a corresponding one of the plurality of expansion slots, a system bus connecting said system-side to said communications interface side, wherein the main board comprises:

an input/output port, a main central processing unit for controlling the information, managing the presence and absence of each of the expansion boards and accessing the input/output port by an interruption that corresponds to one of the expansion boards, and expansion board select means, connected to the main central processing unit, for selecting one of the expansion boards by producing a corresponding expansion slot select signal and thereby causing the selected expansion board to be interrupted, and wherein each of the expansion boards comprises:

a system bus interface means for receiving the expansion slot select signal and for generating a control signal, interruption detection means for decoding an input/output address entered from the system bus, for receiving the control signal and for generating an interruption signal, interruption control means, connected to the interruption detection means, for receiving the interruption signal and for generating an interruption request signal, and a sub central processing unit, connected to the interruption control means and system bus interface means, for receiving the interruption request signal and for performing interruption processing.

5. An information processing apparatus for performing two-way interruption processing between a main board and a plurality of expansion slots, comprising:

storing means for storing information;

input/output means for inputting the information to the storing means and for outputting the information from the storing means; and control means, disposed between the storing means and the input/output means, comprising:

a system side having the main board, a communications interface side having:

the plurality of expansion slots, a plurality of expansion boards, wherein each expansion board is disposed in a corresponding one of the plurality of expansion slots, a system bus, connecting said system-side to said communications interface side, having a plurality of buses for transferring an address signal, a data signal, a control signal and a slot common interruption signal between the main board and each of the expansion boards, wherein the main board comprises:

an input/output port, a main central processing unit for controlling the information, managing the presence and absence of each of the expansion boards and accessing the input/output port by an interruption that corresponds to one of the expansion boards, expansion board select means, connected to the main central processing unit, for selecting one of the expansion boards by producing a corresponding expansion slot select signal and thereby causing the selected expansion board to be interrupted, interruption request determination means, connected to the main central processing unit, the expansion board select means and the system bus, for determining whether a common interruption request is present, for determining whether an individual interruption request is present, and for generating an interruption signal when the interruption request determination means determines that the individual interruption request is present, and interruption control means, connected to the interruption request determining means and the main central processing unit, for receiving the interruption signal and for delivering an interruption request signal to the main central processing unit, and wherein each of the expansion boards comprises:

a system bus interface means for receiving the expansion slot select signal and for generating the control signal, interruption input/output address decoder means for decoding an input/output address entered from the system bus, for receiving the control signal and for generating an expansion board interruption signal expansion board interruption control means, connected to the interruption input/output address decoder means, for receiving the expansion board interruption signal and for generating an expansion board interruption request signal, and a sub central processing unit, connected to the expansion board interruption control means and the system bus interface means, for receiving the expansion board interruption request signal and for performing interruption processing.

* * * * *

UNITED STATES PATENT AND TRADEMARK OFFICE
CERTIFICATE OF CORRECTION

PATENT NO. : 5,317,748
DATED : May 31, 1994
INVENTOR(S) : SHIMIZU, Noriaki

It is certified that error appears in the above-indentified patent and that said Letters Patent is hereby corrected as shown below:

On the title page, under item [19] and item [75], change "Shimuzu" to --Shimizu--.

Signed and Sealed this

Twenty-fifth Day of October, 1994

Attest:

BRUCE LEHMAN

Attesting Officer

Commissioner of Patents and Trademarks